(12) United States Patent
Tsai (10) Patent No.: US 11,742,787 B1
(45) Date of Patent: Aug. 29, 2023

(54) MOTOR CONTROLLER CIRCUIT HAVING STABLE SPEED CONTROLLING MECHANISM

(71) Applicant: ANPEC ELECTRONICS CORPORATION, Hsinchu (TW)

(72) Inventor: Ming-Jung Tsai, Changhua County (TW)

(73) Assignee: ANPEC ELECTRONICS CORPORATION, Hsinchu (TW)

( * ) Notice: Subject to any disclaimer, the term of this patent is extended or adjusted under 35 U.S.C. 154(b) by 0 days.

(21) Appl. No.: 17/842,882

(22) Filed: Jun. 17, 2022

(30) Foreign Application Priority Data

May 11, 2022 (TW) ................................. 111117597

(51) Int. Cl.
- *H02P 6/08* (2016.01)
- *H02P 27/08* (2006.01)
- *H02M 7/5395* (2006.01)
- *H02M 7/5387* (2007.01)

(52) U.S. Cl.
CPC ........ *H02P 27/085* (2013.01); *H02M 7/5395* (2013.01); *H02P 6/08* (2013.01); *H02M 7/53873* (2013.01)

(58) Field of Classification Search
CPC ...... H02P 27/085; H02P 6/08; H02M 7/5395; H02M 7/53873
See application file for complete search history.

(56) References Cited

U.S. PATENT DOCUMENTS

| | | | | |
|---|---|---|---|---|
| 5,400,385 A | * | 3/1995 | Blake | H05G 1/32 323/280 |
| 7,151,349 B1 | * | 12/2006 | Williamson | F04D 27/004 318/599 |
| 9,325,266 B2 | * | 4/2016 | Tsai | H02P 7/29 |
| 2010/0176851 A1 | * | 7/2010 | Jiang | H03K 7/08 327/175 |
| 2015/0061551 A1 | | 3/2015 | Tsai et al. | |
| 2015/0326153 A1 | * | 11/2015 | Gohara | G06F 1/20 318/400.2 |

FOREIGN PATENT DOCUMENTS

TW 201511461 A 3/2015

* cited by examiner

*Primary Examiner* — Rina I Duda
(74) *Attorney, Agent, or Firm* — Li & Cai Intellectual Property (USA) Office (57) ABSTRACT

A motor controller circuit having a stable speed controlling mechanism is provided. A duty cycle determining circuit determines duty cycles of the plurality of waveforms respectively of the first waveform signals within each of a plurality of time intervals to output a duty cycle instructing signal, according to a target working period corresponding to a target rotational speed. A signal generating circuit outputs the plurality of first waveform signals according to the duty cycle instructing signal, and outputs a second waveform signal. A motor control circuit outputs a plurality of on-time signals according to the plurality of first waveform signals and the second waveform signal. A motor driving circuit is controlled to operate and drive a motor to rotate according to the plurality of on-time signals.

10 Claims, 6 Drawing Sheets

FIG. 6

MOTOR CONTROLLER CIRCUIT HAVING STABLE SPEED CONTROLLING MECHANISM

CROSS-REFERENCE TO RELATED PATENT APPLICATION

This application claims the benefit of priority to Taiwan Patent Application No. 111117597, filed on May 11, 2022. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a motor, and more particularly to a motor controller circuit having a stable speed controlling mechanism.

BACKGROUND OF THE DISCLOSURE

In electronic devices, fans are used to cool heat generating components such as processors. When the heat generating components are cooled down by the fans, data from circuits of the fans must be instantly obtained so as to precisely control rotational speeds of three-phase motors of the fans according to the obtained data, such that the fans can properly cool down the heat generating components with efficiency. However, a conventional motor controller circuit cannot drive the three-phase motor to stably rotate at a target rotational speed under the condition that the three-phase motor only generates low noise.

SUMMARY OF THE DISCLOSURE

In response to the above-referenced technical inadequacies, the present disclosure provides a motor controller circuit having a stable speed controlling mechanism. The motor controller circuit is applicable to a motor. The motor controller circuit includes a duty cycle determining circuit, a signal generating circuit, a motor control circuit and a motor driving circuit. The duty cycle determining circuit is configured to determine that a plurality of waveforms of each of a plurality of first waveform signals are generated respectively within a plurality of time intervals. The duty cycle determining circuit is configured to determine that each one of the plurality of waveforms of each of the plurality of first waveform signals is generated within one of the plurality of time intervals. The duty cycle determining circuit is configured to determine a plurality of duty cycles of the plurality of waveforms respectively of the plurality of first waveform signals within each of the plurality of time intervals to output a duty cycle instructing signal, according to a target duty cycle corresponding to a target rotational speed of the motor. The signal generating circuit is connected to the duty cycle determining circuit. The signal generating circuit is configured to output the plurality of first waveform signals according to the duty cycle instructing signal. The signal generating circuit is configured to output a second waveform signal. The motor control circuit is connected to the signal generating circuit. The motor control circuit is configured to output a plurality of on-time signals according to the plurality of first waveform signals and the second waveform signal. The motor controller circuit outputs each one of the plurality of on-time signals according to one of the plurality of first waveform signals and the second waveform signal. The motor driving circuit is connected to the motor control circuit. The motor driving circuit is configured to operate and drive the motor to rotate according to the plurality of on-time signals.

In certain embodiments, the waveforms of each of the first waveform signals include triangular waveforms or sawtooth waveforms.

In certain embodiments, the waveforms of the second waveform signal include sine waveforms or third harmonic waveforms.

In certain embodiments, the signal generating circuit determines and adjusts amplitudes of the waveforms of each of the first waveform signals according to the duty cycle instructing signal.

In certain embodiments, the signal generating circuit determines and adjusts peak values of the waveforms of each of the first waveform signals according to the duty cycle instructing signal.

In certain embodiments, the motor control circuit compares a value of each of the plurality of first waveform signals with a value of the second waveform signal at each of plurality of time points to determine a level of each of the on-time signals at each of the plurality of time points.

In certain embodiments, when the motor control circuit determines that a value of each of the plurality of first waveform signals is larger than a value of the second waveform signal, the motor control circuit determines that each of the on-time signals is at a first level. When the motor control circuit determines that the value of each of the plurality of first waveform signals is smaller than the value of the second waveform signal, the motor control circuit determines that each of the on-time signals is at a second level. The second level is different from the first level.

In certain embodiments, the signal generating circuit determines, according to the target duty cycle, that the plurality of duty cycles of the plurality of waveforms respectively of the plurality of first waveform signals within each of the time intervals are respectively different reference duty cycles, and that values of the plurality of waveforms of the plurality of first waveform signals.

In certain embodiments, the signal generating circuit stores a plurality of preset duty cycles, and selects multiple ones of the plurality of preset duty cycles as the reference duty cycles according to the target duty cycle.

In certain embodiments, the motor controller circuit further includes a waveform grouping circuit. The waveform grouping circuit is connected to the duty cycle determining circuit and the signal generating circuit. The waveform grouping circuit determines how many of the second waveform signals are grouped into a same one of a plurality of groups to output a waveform grouped instructing signal, according to the target rotational speed. The duty cycle determining circuit determines each of the plurality of waveforms of the first waveform signals according to the waveform grouped instructing signal. The signal generating circuit outputs the first waveform signals and the second waveform signal, according to the duty cycle instructing signal and the waveform grouped instructing signal.

As described above, the present disclosure provides the motor controller circuit having the stable speed controlling mechanism. The plurality of duty cycles of the plurality of waveforms of the plurality of first waveform signals (and the second waveform signal) are adjusted by the motor controller circuit of the present disclosure. Then, the plurality of on-time signals are generated according to the plurality of waveforms of the plurality of first waveform signals and the second waveform signal by the motor controller circuit of the present disclosure. The motor is driven to rotate stably at the target rotational speed according to the plurality of on-time signals generated by the motor controller circuit of the present disclosure.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Figure 1:
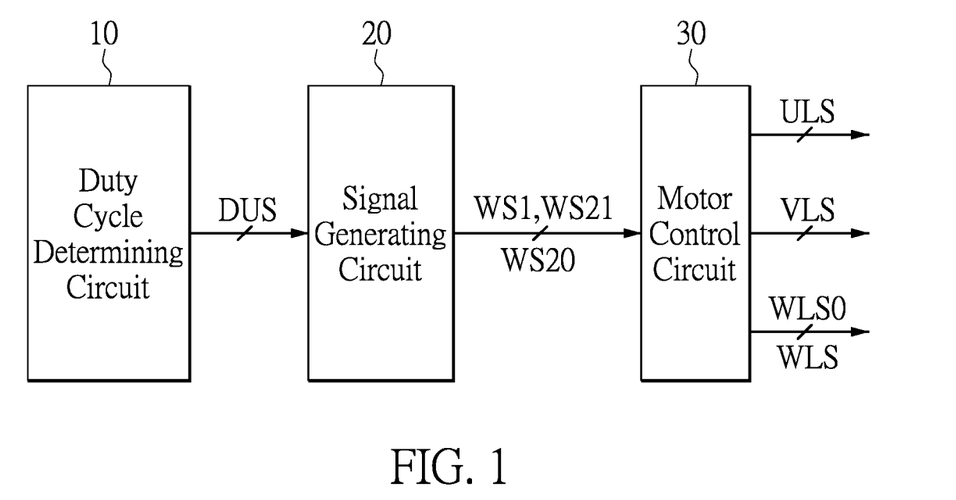
FIG. 1 is a block diagram of a motor controller circuit having a stable speed controlling mechanism according to a first embodiment of the present disclosure.
Figure 2:
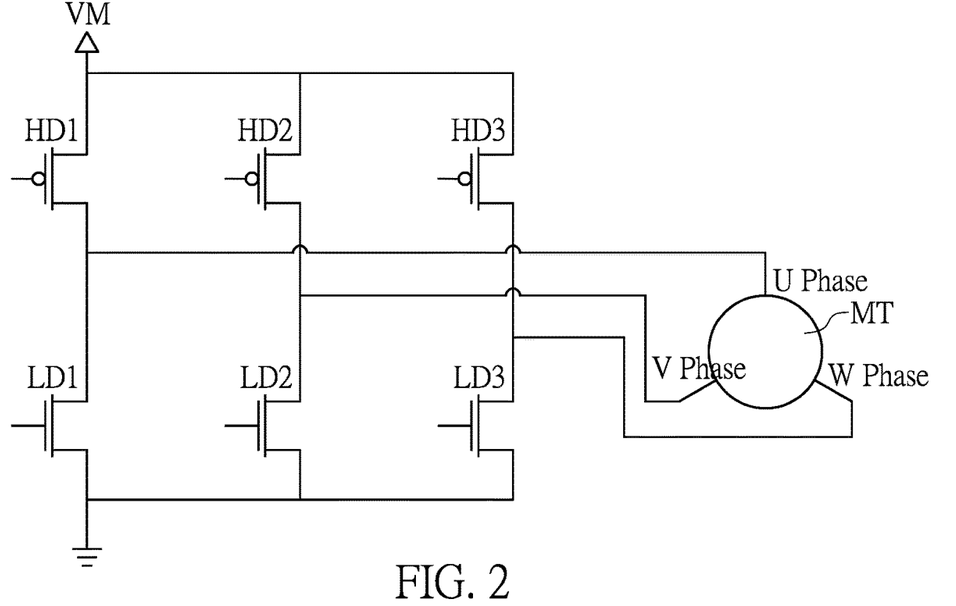
FIG. 2 is a circuit diagram of a motor and a motor driving circuit of the motor controller circuit having the stable speed controlling mechanism according to the first embodiment of the present disclosure.
Figure 3:
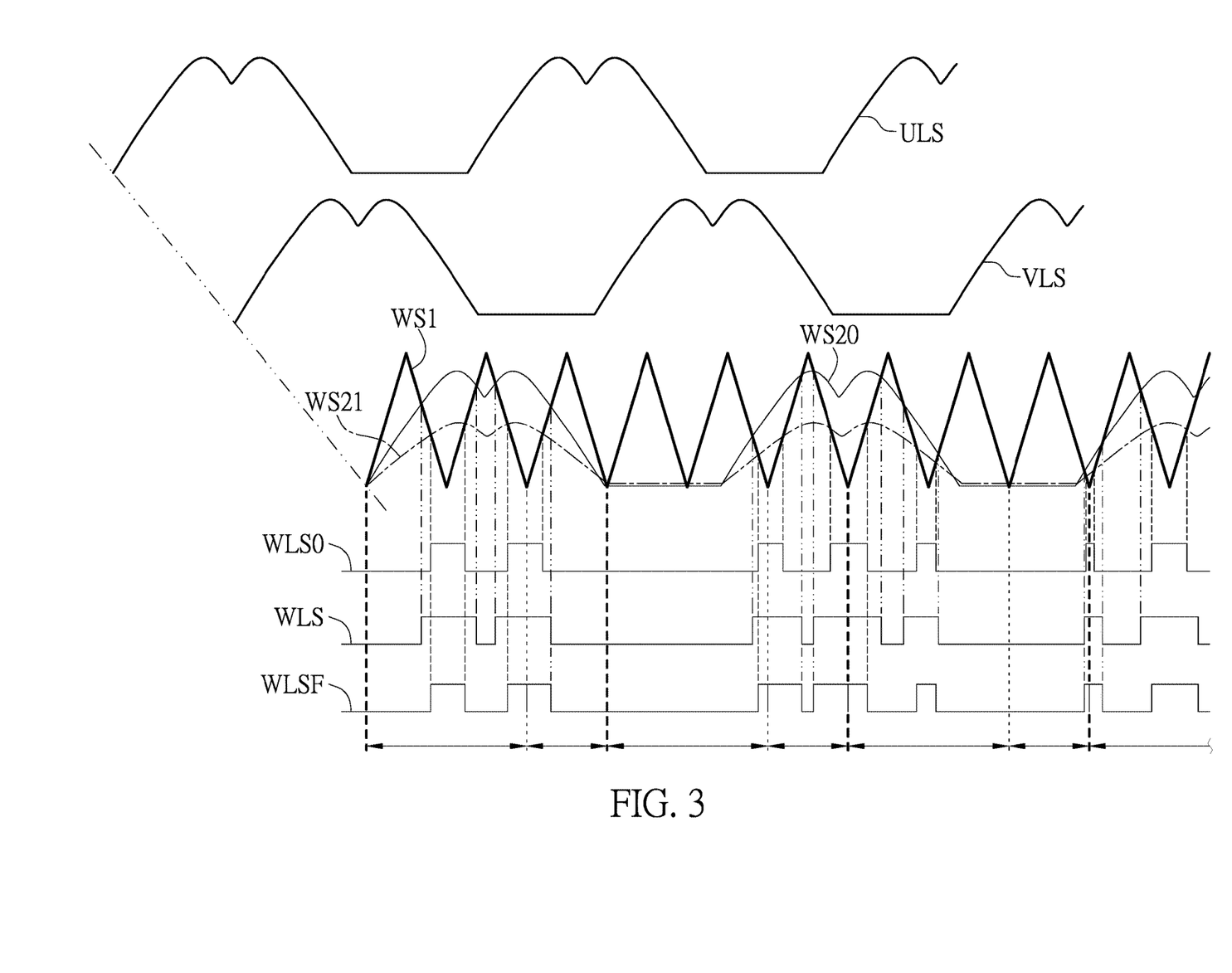
FIG. 3 is a waveform diagram of signals of the motor controller circuit having the stable speed controlling mechanism according to the first embodiment of the present disclosure.
Figure 4:
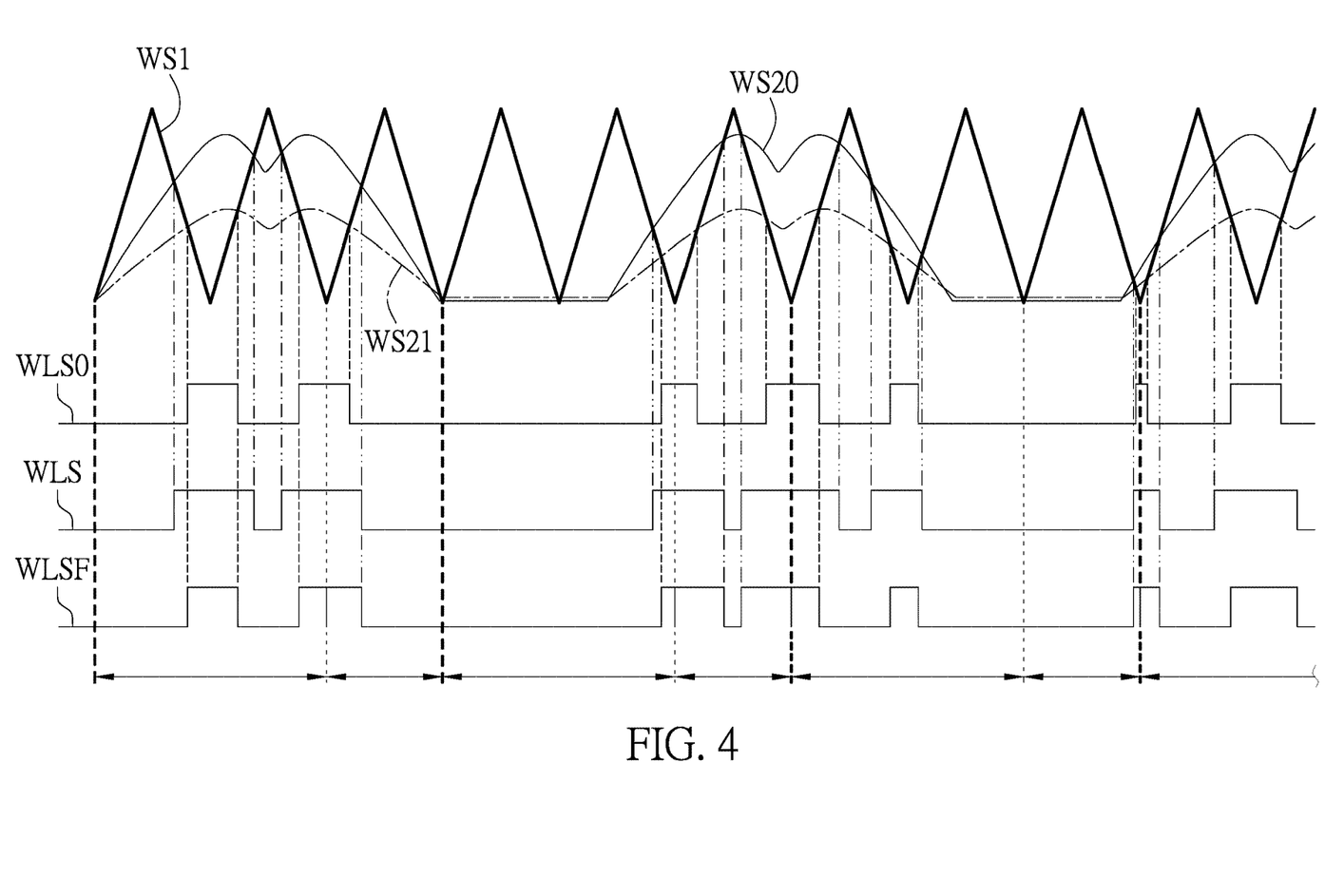
FIG. 4 is a waveform diagram of the signals of the motor controller circuit having the stable speed controlling mechanism according to the first embodiment of the present disclosure.

Reference is made to FIGS. 1 to 4, in which FIG. 1 is a block diagram of a motor controller circuit having a stable speed controlling mechanism according to a first embodiment of the present disclosure, FIG. 2 is a circuit diagram of a motor and a motor driving circuit of the motor controller circuit having the stable speed controlling mechanism according to the first embodiment of the present disclosure, and FIGS. 3 and 4 are waveform diagrams of signals of the motor controller circuit having the stable speed controlling mechanism according to the first embodiment of the present disclosure.

The speed controlling mechanism of the embodiment of the present disclosure may include a duty cycle determining circuit 10, a signal generating circuit 20 and a motor control circuit 30 as shown in FIG. 1, and a motor driving circuit.

The motor driving circuit may include a bridge circuit. The bridge circuit may include a plurality of high-side switches such as a first high-side switch HD1, a second high-side switch HD2 and a third high-side switch HD3 as shown in FIG. 2, and a plurality of low-side switches such as a first low-side switch LD1, a second low-side switch LD2 and a third low-side switch LD3 as shown in FIG. 2.

The signal generating circuit 20 may be connected to the duty cycle determining circuit 10 and the motor control circuit 30. The motor control circuit 30 may be connected to the motor driving circuit. The motor driving circuit may be connected to a motor MT such as a three-phase motor.

In detail, a first terminal of the first high-side switch HD1, a first terminal of the second high-side switch HD2 and a first terminal of the third high-side switch HD3 may be coupled to a common voltage VM. A second terminal of the first high-side switch HD1 may be connected to a first terminal of the first low-side switch LD1. A second terminal of the second high-side switch HD2 may be connected to a first terminal of the second low-side switch LD2. A second terminal of the third high-side switch HD3 may be connected to a first terminal of the third low-side switch LD3. A second terminal of the first low-side switch LD1, a second terminal of the second low-side switch LD2 and a second terminal of the third low-side switch LD3 may be grounded.

A node between the second terminal of the first high-side switch HD1 and the first terminal of the first low-side switch LD1 may be connected to a first terminal such as a U-phase terminal of the motor MT. A node between the second terminal of the second high-side switch HD2 and the first terminal of the second low-side switch LD2 may be connected to a second terminal such as a V-phase terminal of the motor MT. A node between the second terminal of the third high-side switch HD3 and the first terminal of the third low-side switch LD3 may be connected to a third terminal such as a W-phase terminal of the motor MT.

The motor control circuit 40 may be connected to a control terminal of each of the high-side switches (such as the first high-side switch HD1, the second high-side switch HD2 and the third high-side switch HD3). The motor control circuit 40 may be connected to a control terminal of each of the low-side switches (such as the first low-side switch LD1, the second low-side switch LD2 and the third low-side switch LD3). The output signal generating circuit 30 may turn on or off each of the high-side switches and the low-side switches.

It is worth noting that, the duty cycle determining circuit 10 may determine that a plurality of waveforms of each of a plurality of first waveform signals WS20 and WS21 are generated respectively within a plurality of time intervals. The duty cycle determining circuit 10 may determine a plurality of duty cycles of the plurality of waveforms respectively of the plurality of first waveform signals WS20 and WS21 to output a duty cycle instructing signal DUS according to (a target duty cycle corresponding to) a target rotational speed of the motor MT. Each one of the plurality of waveforms of each of the first waveform signals WS20 and WS21 is generated within one of the plurality of time intervals. The duty cycle of the waveform of the first waveform signal WS20 is different from the duty cycle of the waveform of the first waveform signal WS21, within the same one of the plurality of time intervals.

The signal generating circuit 20 may output the first waveform signals WS20 and WS21 according to the duty cycle instructing signal DUS, and may output a second waveform signal WS1.

For example, as shown in FIG. 3, the waveforms of each of the first waveform signals WS20 and WS21 may include third harmonic waveforms, and the waveforms of the second waveform signal WS1 may include triangle waveforms, but the present disclosure is not limited thereto. In practice, the third harmonic waveforms of each of the first waveform signals WS20 and WS21 may be replaced with sine waveforms or other waveforms, and the waveforms of the second waveform signal WS1 may include sawtooth waveforms or other waveforms.

The motor control circuit 30 may output an on-time signal WLS according to the first waveform signal WS20 and the second waveform signal WS1 from the signal generating circuit 20. The motor control circuit 30 may output an on-time signal WLS0 according to the first waveform signal WS21 and the second waveform signal WS1 from the signal generating circuit 20.

In detail, the motor control circuit 30 may compare a value of the first waveform signal WS20 with a value of the second waveform signal WS1 at each of plurality of time points to determine a level of the on-time signal WLS at each of the time points. The motor control circuit 30 may compare a value of the first waveform signal WS21 with the value of the second waveform signal WS1 at each of the time points to determine a level of the on-time signal WLS0 at each of the time points.

For example, when the motor control circuit 30 determines that the value of the first waveform signal WS20 is larger than the value of the second waveform signal WS1 at one of the time points, the motor control circuit 30 determines that the on-time signal WLS is at a first level such as a high level at the one of the time points. When the motor control circuit 30 determines that the value of the first waveform signal WS21 is larger than the value of the second waveform signal WS1 at one of the time points, the motor control circuit 30 determines that the on-time signal WLS0 is at the first level such as the high level at the one of the time points.

Conversely, when the motor control circuit 30 determines that the value of the first waveform signal WS20 is smaller than the value of the second waveform signal WS1 at one of the time points, the motor control circuit 30 determines that the on-time signal WLS is at a second level such as a low level at the one of the time points. When the motor control circuit 30 determines that the value of the first waveform signal WS21 is smaller than the value of the second waveform signal WS1 at one of the time points, the motor control circuit 30 determines that the on-time signal WLS0 is at the second level such as the low level at the one of the time points.

It is understood that, duty cycles of the on-time signal WLS depend on the levels of the on-time signal WLS, and duty cycles of the on-time signal WLS0 depend on the levels of the on-time signal WLS0. The on-time signal WLS is at the high level during a working period of the on-time signal WLS, and the on-time signal WLS0 is at the high level during a working period of the on-time signal WLS0. The on-time signal WLS is at the low level during a non-working period of the on-time signal WLS, and the on-time signal WLS0 is at the low level during a non-working period of the on-time signal WLS0.

Therefore, the signal generating circuit 20 may determine and adjust the values of the waveforms of the first waveform signals WS20 and WS21, in particular to peak values and valley values, according to the target duty cycle corresponding to the target rotational speed of the motor MT that is instructed by the duty cycle instructing signal DUS.

It is worth noting that, a duty cycle of each of plurality of waveforms of one first waveform signal outputted by the signal generating circuit 20 cannot be equal to the target duty cycle corresponding to the target rotational speed of the motor MT, and only can be equal to one of a plurality of preset duty cycles such as 0%, 25%, 50%, 75%, 100%. Under this condition, the duty cycles of the first waveform signals WS20 and WS21 that are respectively equal to the preset duty cycles can be used together to achieve an effect that is realized by using the target duty cycle, within each one of the plurality of time intervals. The plurality of preset duty cycles may be stored in the motor control circuit 30.

In the embodiment, the signal generating circuit 20 selects multiple ones of the plurality preset duty cycles respectively as a plurality of reference duty cycles according to the target rotational speed of the motor MT. The signal generating circuit 20 determines that the plurality of duty cycles of the plurality of waveforms respectively of the plurality of first waveform signals WS20 and WS21 within each of the time intervals are respectively the plurality of reference duty cycles. Some or all of the plurality of reference duty cycles may be different from each other. As shown in FIGS. 3 and 4, within a same one of the plurality of time intervals, the duty cycle (such as 50% of a peak amplitude) of the waveform of the first waveform signal WS20 is different from the duty cycle (such as 75% of the peak amplitude) of the waveform of the first waveform signal WS21.

In the embodiment, the signal generating circuit 20 may determine the (peak) values of the (sine or third harmonic) waveforms of the first waveform signals WS20 and WS21 according to the reference duty cycles, and output the first waveform signals WS20 and WS21. The signal generating circuit 20 may output the preset (triangular or sawtooth) waveforms of the second waveform signal WS1.

The motor control circuit 30 may output the on-time signal WLS to (the control terminal of the three high-side switch HD3 of) the motor driving circuit according to the first waveform signal WS20 and the second waveform signal WS1. The motor control circuit 30 may output the on-time signal WLS0 to (the control terminal of the three high-side switch HD3 of) the motor driving circuit according to the first waveform signal WS21 and the second waveform signal WS1. In addition, the motor control circuit 30 may output other on-time signals ULS and VLS to (others of the high-side switches or the low-side switches of) the motor driving circuit. The motor MT is driven by the motor driving circuit according to the on-time signal WLS, ULS and VLS.

Figure 5:
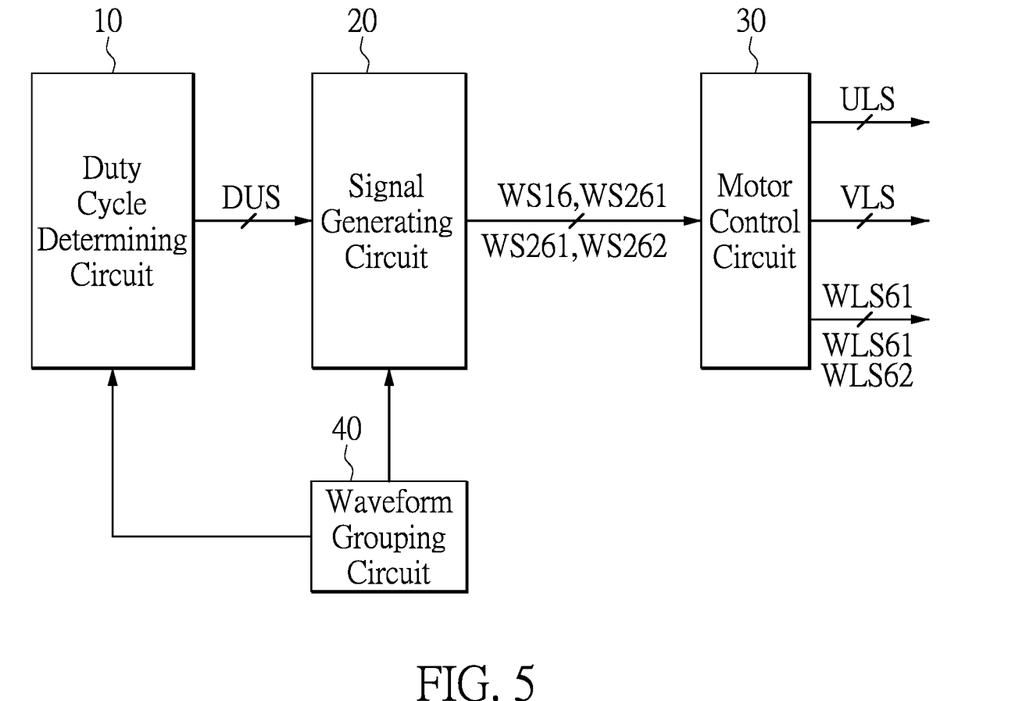
FIG. 5 is a block diagram of a motor controller circuit having a stable speed controlling mechanism according to a second embodiment of the present disclosure.
Figure 6:
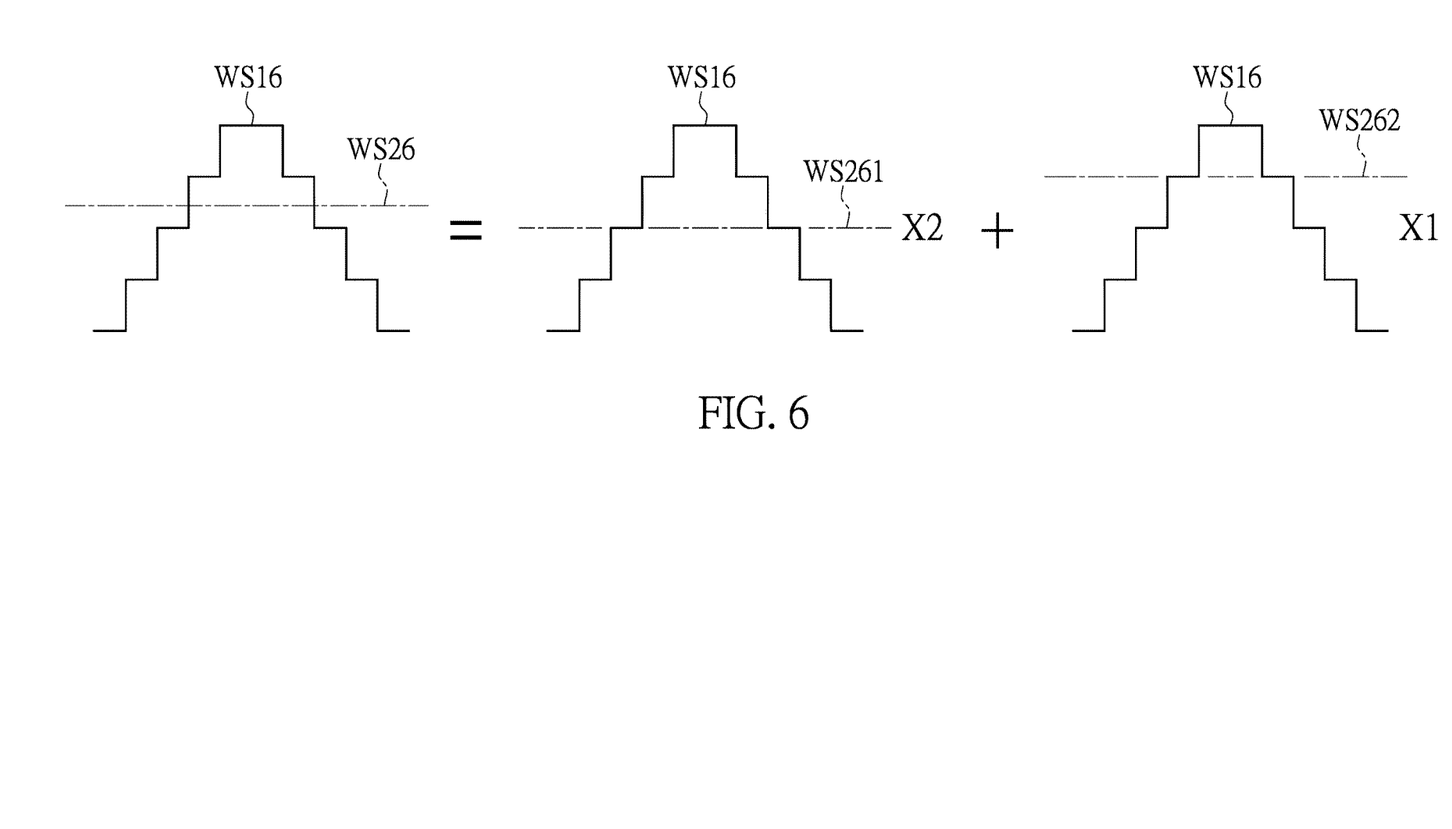
FIG. 6 is a waveform diagram of signals of the motor controller circuit having the stable speed controlling mechanism according to the second embodiment of the present disclosure.

Reference is made to FIGS. 5 and 6, in which FIG. 5 is a block diagram of a motor controller circuit having a stable speed controlling mechanism according to a second embodiment of the present disclosure, and FIG. 6 is a waveform diagram of signals of the motor controller circuit having the stable speed controlling mechanism according to the second embodiment of the present disclosure. The same descriptions of the first and second embodiments are not repeated herein.

The signal generating circuit 20 generates a second waveform signal WS16 having the same triangular waveforms that are not changed with a change in the target rotational speed of a motor. Rising and falling waveform segments of the triangular waveforms of the second waveform signal WS16 may be smooth waveform segments as that of the second waveform signal WS1 as shown in FIGS. 3 and 4, or may be staircase-shaped waveform segments as shown in FIG. 6.

The motor control circuit 30 may compare a value of the second waveform signal WS16 with a value of a first waveform signal WS261 at each of plurality of time points to determine a level of an on-time signal WLS61 at each of the time points. The motor control circuit 30 may compare a value of the second waveform signal WS16 with a value of a first waveform signal WS262 at each of the plurality of time points to determine a level of an on-time signal WLS62 at each of the time points. The motor control circuit 30 outputs the on-time signal WLS61 and WLS62 to the motor driving circuit. The motor driving circuit is controlled to drive the motor to rotate according to the on-time signal WLS61 and WLS62.

The motor controller circuit of the embodiment of the present disclosure may further include a waveform grouping circuit 40 by which the rotational speed of the motor is controlled more precisely. The waveform grouping circuit 40 may be connected to the duty cycle determining circuit 10 and the signal generating circuit 20.

The waveform grouping circuit 40 may determine which some of the triangular waveforms of the second waveform signal WS16 are grouped into a same one of a plurality of groups, numbers of the triangular waveforms in each of the plurality of groups and the number of the plurality of groups to output a waveform grouped instructing signal, according to the target duty cycle corresponding to the target rotational speed.

The duty cycle determining circuit 10 may determine (duty cycles of) of the third harmonic waveforms of the first waveform signals WS261 and WS262 to output the duty cycle instructing signal, according to the waveform grouped instructing signal. The signal generating circuit 20 may output the first waveform signals WS261 and WS262 and the second waveform signal WS16 to the motor control circuit 30, according to the duty cycle instructing signal and the waveform grouped instructing signal.

The duty cycle of each of plurality of waveforms of one first waveform signal outputted by the signal generating circuit 20 cannot be equal to the target duty cycle corresponding to the target rotational speed of the motor, and only can be equal to one of the plurality of preset duty cycles such as 0%, 25%, 50%, 75%, 100%. Under this condition, as shown in FIG. 6, the duty cycles of the two first waveform signals WS261 and the one waveform signal WS262 that are respectively equal to the preset duty cycles can be used together to achieve an effect that is realized by using the target duty cycle of a first waveform signal WS26.

For example, as shown in FIG. 6, if the target duty cycle of the first waveform signal WS26 is 58.3% corresponding to the target rotational speed of 58.3 rpm, three ones of the plurality of triangular waveforms of the second waveform signal WS16 are grouped in a same one of the plurality of groups. In the same one of the plurality of groups, two ones of the three triangular waveforms are respectively aligned with the two preset duty cycles respectively of the two first waveform signals WS261 that are 50% and 50%, and one of the three triangular waveforms is aligned with one preset duty cycle of 75% of the first waveform signal WS262. The target duty cycle of 58.3% is realized by the two preset duty cycles of 50% and the one preset duty cycle of 75%, which is represented by the following equation: $[(2 \times 50\%) + (1 \times 75\%)]/3 \cong 58.3\%$.

Then, if the target duty cycle of the first waveform signal WS26 is changed to 66.6% corresponding to the target rotational speed of 66.6 rpm, three ones of the plurality of triangular waveforms of the second waveform signal WS16 are grouped in a same one of the plurality of groups. In the same one of the plurality of groups, two ones of the three triangular waveforms are respectively aligned with the two preset duty cycles respectively of the two first waveform signals WS261 that are 75% and 75%, and one of the three triangular waveforms is aligned with one preset duty cycle of 50% of the first waveform signal WS262. The target duty cycle of 66.6% is realized by the two preset duty cycles of 75%, and the one preset duty cycle of 50%, which is represented by the following equation: $[(2 \times 75\%) + (1 \times 55\%)]/3 \cong 66.6\%$. A percentage associated with a resolution is calculated by the following equation: $66.6\% - 58.3\% = 8.3\%$.

Alternatively, if the target duty cycle of the first waveform signal WS26 is 62.5% corresponding to the target rotational speed of 62.5 rpm, four ones of the triangular waveforms are grouped in a same one of the plurality of groups. In the same one of the plurality of groups, two ones of the four triangular waveforms are respectively aligned with the two preset duty cycles of 50% and the other two ones of the four triangular waveforms are respectively aligned with the two preset duty cycle of 75%. The target duty cycle of 62.5% is realized by the two preset duty cycles of 75%, and the two preset duty cycle of 50%, which is represented by the following equation:

$$[(2 \times 50\%) + (2 \times 75\%)]/4 \cong 62.5\%.$$

Then, if the target duty cycle of the first waveform signal WS26 is changed to 68.75% corresponding to the target rotational speed of 68.75 rpm, four ones of the triangular waveforms are grouped in a same one of the plurality of groups. In the same one of the plurality of groups, one of the four triangular waveforms is aligned with the preset duty cycle of 50% and other three ones of the four triangular waveforms are respectively aligned with the three preset duty cycle of 75%. The target duty cycle of 68.75% is realized by the one preset duty cycles of 50% and the three preset duty cycle of 75%, which is represented by the following equation: [(1×50%)+(3×75%)]/4≅68.75%. A percentage associated with a resolution is calculated by the following equation: 68.75%−62.5%=6.25% that is smaller than the above-mentioned percentage of 8.3%. It means that, this resolution associated with the percentage of 6.25% is higher than the resolution associated with the percentage of 8.3%.

Finally, the motor control circuit 30 may compare the (voltage) values of the second waveform signal WS16 respectively with the (voltage) values of the first waveform signal WS261 to output the on-time signal WLS61 to the motor driving circuit. The motor control circuit 30 may compare the (voltage) values of the second waveform signal WS16 respectively with the (voltage) values of the first waveform signal WS262 to output the on-time signal WLS62 to the motor driving circuit. The motor driving circuit drives the motor such that the motor stably rotates at the target rotational speed according to the plurality of on-time signals WLS61 and WLS62.

In conclusion, the present disclosure provides the motor controller circuit having the stable speed controlling mechanism. The plurality of duty cycles of the plurality of waveforms of the plurality of first waveform signals (and the second waveform signal) are adjusted by the motor controller circuit of the present disclosure. Then, the plurality of on-time signals are generated according to the plurality of waveforms of the plurality of first waveform signals and the second waveform signal by the motor controller circuit of the present disclosure. The motor is driven to rotate stably at the target rotational speed according to the plurality of on-time signals generated by the motor controller circuit of the present disclosure.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A motor controller circuit having a stable speed controlling mechanism, which is applicable to a motor, the motor controller circuit comprising:
   a duty cycle determining circuit, wherein the duty cycle determining circuit is configured to determine that a plurality of waveforms of each of a plurality of first waveform signals are generated respectively within a plurality of time intervals, the duty cycle determining circuit is configured to determine that each one of the plurality of waveforms of each of the plurality of first waveform signals is generated within one of the plurality of time intervals, and the duty cycle determining circuit is configured to determine a plurality of duty cycles of the plurality of waveforms respectively of the plurality of first waveform signals within each of the plurality of time intervals to output a duty cycle instructing signal, according to a target duty cycle corresponding to a target rotational speed of the motor;
   a signal generating circuit connected to the duty cycle determining circuit, configured to output the plurality of first waveform signals according to the duty cycle instructing signal, and configured to output a second waveform signal;
   a motor control circuit connected to the signal generating circuit, and configured to output a plurality of on-time signals according to the plurality of first waveform signals and the second waveform signal, wherein the motor controller circuit outputs each one of the plurality of on-time signals according to one of the plurality of first waveform signals and the second waveform signal; and
   a motor driving circuit connected to the motor control circuit, and configured to operate and drive the motor to rotate according to the plurality of on-time signals.

2. The motor controller circuit according to claim 1, wherein the waveforms of each of the first waveform signals include triangular waveforms or sawtooth waveforms.

3. The motor controller circuit according to claim 1, wherein the waveforms of the second waveform signal include sine waveforms or third harmonic waveforms.

4. The motor controller circuit according to claim 1, wherein the signal generating circuit determines and adjusts amplitudes of the waveforms of each of the first waveform signals according to the duty cycle instructing signal.

5. The motor controller circuit according to claim 1, wherein the signal generating circuit determines and adjusts peak values of the waveforms of each of the first waveform signals according to the duty cycle instructing signal.

6. The motor controller circuit according to claim 1, wherein the motor control circuit compares a value of each of the plurality of first waveform signals with a value of the second waveform signal at each of a plurality of time points to determine a level of each of the on-time signals at each of the plurality of time points.

7. The motor controller circuit according to claim 1, wherein, when the motor control circuit determines that a value of each of the plurality of first waveform signals is larger than a value of the second waveform signal, the motor control circuit determines that each of the on-time signals is at a first level;
   wherein, when the motor control circuit determines that the value of each of the plurality of first waveform signals is smaller than the value of the second waveform signal, the motor control circuit determines that each of the on-time signals is at a second level, and the second level is different from the first level.

8. The motor controller circuit according to claim 1, wherein the signal generating circuit determines, according to the target duty cycle, that the plurality of duty cycles of the plurality of waveforms respectively of the plurality of first waveform signals within each of the time intervals are respectively different reference duty cycles, so as to determine values of the plurality of waveforms of the plurality of first waveform signals.

9. The motor controller circuit according to claim 8, wherein the signal generating circuit stores a plurality of preset duty cycles, and selects multiple ones of the plurality of preset duty cycles as the reference duty cycles according to the target duty cycle.

10. The motor controller circuit according to claim 1, further comprising:
   a waveform grouping circuit connected to the duty cycle determining circuit and the signal generating circuit, wherein the waveform grouping circuit determines a quantity of the second waveform signals that are grouped into a same one of a plurality of groups to output a waveform grouped instructing signal according to the target rotational speed, the duty cycle determining circuit determines each of the plurality of waveforms of the first waveform signals according to the waveform grouped instructing signal, and the signal generating circuit outputs the first waveform signals and the second waveform signal according to the duty cycle instructing signal and the waveform grouped instructing signal.

* * * * *